(12) United States Patent
Naganuma et al.

(10) Patent No.: US 7,976,067 B2
(45) Date of Patent: Jul. 12, 2011

(54) GAS FUEL TANK-EQUIPPED VEHICLE

(75) Inventors: Yoshiaki Naganuma, Nissin (JP);
Norimasa Ishikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 650 days.

(21) Appl. No.: 11/792,560

(22) PCT Filed: Jan. 6, 2006

(86) PCT No.: PCT/JP2006/300107
§ 371 (c)(1),
(2), (4) Date: Jun. 7, 2007

(87) PCT Pub. No.: WO2006/073192
PCT Pub. Date: Jul. 13, 2006

(65) Prior Publication Data
US 2008/0115998 A1  May 22, 2008

(30) Foreign Application Priority Data

Jan. 7, 2005 (JP) ................................. 2005-002270
Jan. 7, 2005 (JP) ................................. 2005-002272

(51) Int. Cl.
  *B60P 3/22* (2006.01)
(52) U.S. Cl. ................. 280/834; 280/830; 180/69.2
(58) Field of Classification Search .......... 280/830–834; 180/69.2, 69.24, 69.4
See application file for complete search history.

(56) References Cited

U.S. PATENT DOCUMENTS

| | | | | |
|---|---|---|---|---|
| 5,405,167 A * | 4/1995 | Lee | .............. | 280/830 |
| 5,787,920 A * | 8/1998 | Krasnov | .............. | 137/255 |
| 5,890,740 A * | 4/1999 | Kami | .............. | 280/834 |
| 6,257,360 B1 * | 7/2001 | Wozniak et al. | .............. | 180/69.5 |
| 6,412,588 B1 * | 7/2002 | Scott et al. | .............. | 180/314 |
| 6,418,962 B1 * | 7/2002 | Wozniak et al. | .............. | 137/266 |
| 6,505,696 B1 * | 1/2003 | Prevost | .............. | 180/68.4 |
| 7,189,040 B2 * | 3/2007 | Sharp et al. | .............. | 410/42 |
| 7,198,301 B2 * | 4/2007 | Wozniak et al. | .............. | 280/830 |
| 7,422,242 B2 * | 9/2008 | Matsumoto et al. | .............. | 280/834 |
| 7,543,667 B2 * | 6/2009 | Hwang et al. | .............. | 180/69.4 |
| 7,624,753 B2 * | 12/2009 | Suess et al. | .............. | 137/266 |

(Continued)

FOREIGN PATENT DOCUMENTS

DE  27 24 019 A  12/1978

(Continued)

*Primary Examiner* — Joanne Silbermann
*Assistant Examiner* — Tashiana Adams
(74) *Attorney, Agent, or Firm* — Kenyon & Kenyon LLP

(57) ABSTRACT

Hydrogen leaking from a hydrogen cylinder has a lower specific gravity than air, thus rises in a cylinder housing space, and reaches a ventilating opening constituted by a group of slits formed in an upper surface of a roof cover. At this time, the ventilating opening is formed in a position above the hydrogen cylinder, and thus the leaking hydrogen can reach the ventilating opening in a short distance as compared with the case where the ventilating opening is formed in a position apart from the position above the hydrogen cylinder. The ventilating openings are provided in a plurality of locations, and thus the leaking hydrogen reaches the closest ventilating opening. The hydrogen gas reaches the ventilating opening, passes upward therethrough and flows outside.

8 Claims, 8 Drawing Sheets

U.S. PATENT DOCUMENTS

| | | | |
|---|---|---|---|
| 2003/0189334 A1* | 10/2003 | Kawasaki et al. | 280/834 |
| 2004/0026427 A1 | 2/2004 | Shigematsu | |
| 2006/0032532 A1* | 2/2006 | Suess et al. | 137/266 |
| 2006/0033322 A1* | 2/2006 | Suess | 280/830 |
| 2006/0214416 A1* | 9/2006 | Watanabe et al. | 280/834 |

FOREIGN PATENT DOCUMENTS

| | | |
|---|---|---|
| DE | 28 41 277 A | 4/1980 |
| DE | 103 06 872 A1 | 10/2003 |
| EP | 1 145 892 A2 | 10/2001 |
| JP | 62-64682 U | 4/1987 |
| JP | 63-247175 | 10/1988 |
| JP | 04-243629 A | 8/1992 |
| JP | 05-077648 | 3/1993 |
| JP | 07-272735 | 10/1995 |
| JP | 11-348839 | 12/1999 |
| JP | 2000-127860 A | 5/2000 |
| JP | 2000-225855 A | 8/2000 |
| JP | 2001-102073 A | 4/2001 |
| JP | 2001-239845 A | 9/2001 |
| JP | 2001-239956 A | 9/2001 |
| JP | 2003-149071 A | 6/2003 |

* cited by examiner

GAS FUEL TANK-EQUIPPED VEHICLE

This is a 371 national phase application of PCT/JP2006/300107 filed 6 Jan. 2006, which claims priority to Japanese Patent Applications No. 2005-002270 & No. 2005-002272, both filed 7 Jan. 2005, the contents of which are incorporated herein by reference.

TECHNICAL FIELD

The present invention relates to a gas fuel tank-equipped vehicle.

BACKGROUND ART

In recent years, a low-emission vehicle has been known to which a gas fuel tank filled with high pressure gas fuel is mounted. For example, Japanese Patent Laid-Open No. 2000-127860 discloses a bus to which a CNG cylinder filled with compression natural gas (CNG) as gas fuel is mounted. This bus is such that a roof cover that covers a roof forms a cylinder housing space that houses the CNG cylinder, and a gap is provided between a lower edge of a front surface of the roof cover and the roof. When the bus runs, air flows into the cylinder housing space through the gap, and the air having passed through the cylinder housing space flows outside from an air outflow portion provided in a rear surface of the roof cover.

DISCLOSURE OF THE INVENTION

However, supposing the case where gas fuel leaks from a gas fuel tank due to some circumstances, the gas fuel accumulated in the cylinder housing space is preferably discharged at an early stage, but in Japanese Patent Laid-Open No. 2000-127860 described above, the gas fuel accumulated in the cylinder housing space is hard to flow when the bus does not run, and the gas fuel cannot be discharged at an early stage.

The present invention is achieved in view of such a problem, and has an object to provide a gas fuel tank-equipped vehicle in which gas fuel accumulated in a tank housing space can be discharged at an early stage.

The present invention has constructions discussed below, in order to attain at least part of the above and the other related objects.

The present invention is directed to a gas fuel tank-equipped vehicle including a roof cover that is provided to cover a roof and forms a tank housing space that can house one or more gas fuel tanks, and a ventilating opening formed in a position above the gas fuel tank in an upper surface of said roof cover.

In the gas fuel tank-equipped vehicle, gas fuel filled in the gas fuel tank has a lower specific gravity than air such as CNG (having methane as a main ingredient) or hydrogen. Thus, in the case where the fuel gas leaks from the gas fuel tank due to some circumstances, the fuel gas is lighter than air and thus rises in the tank housing space, immediately reaches a ventilating opening formed in a position above the gas fuel tank in an upper surface of the roof cover, and efficiently flows outside therefrom. This allows fuel gas accumulated in the tank housing space to be discharged at an early stage. The vehicle may include an automobile such as a bus, a large car, or a compact car, or a train.

In the gas fuel tank-equipped vehicle of the present invention, the ventilating openings may be provided in a plurality of positions above the gas fuel tank in the upper surface of the roof cover. Thus, the gas fuel in the tank housing space flows outside from the closest ventilating opening among the ventilating openings provided in the plurality of positions, and thus more efficiently flows out.

In the gas fuel tank-equipped vehicle of the present invention, the ventilating opening may be constituted by a group of slits formed by a plurality of louvers spanning an opening provided in the roof cover at spaced intervals. Thus, the louvers protect the gas fuel tank from a flying rock or sunlight, or the like, and durability of the gas fuel tank is increased as compared with the case where the ventilating opening is a simple opening.

In this case, the louver may be a member having an inclined portion inclined with respect to a horizontal surface and a horizontal portion connected to at least one end of the inclined portion and substantially horizontally formed. Thus, the horizontal portion of the louver prevents a flying rock or the like from directly hitting the gas fuel tank, and the inclined portion of the louver prevents sunlight from being directly applied to the gas fuel tank. The louver may be a member having a substantially Z-shaped section in which a horizontal portion is connected to opposite ends of an inclined portion. This further increases a function of the louver of protecting the gas fuel tank. The inclined portion of the louver may be inclined by an angle of 10° to 40° with respect to the horizontal surface. This substantially prevents sunlight during the day from being applied to the gas fuel tank.

In the gas fuel tank-equipped vehicle of the present invention, the ventilating opening may be a gap extending in a longitudinal direction in the roof cover on each of the right and left of the vehicle.

In the gas fuel tank-equipped vehicle of the present invention, a total opening area of an opening including the ventilating opening in the roof cover may be determined based on at least the capacity of the tank housing space. For example, the total opening area may increase with an increasing capacity of the tank housing space. This allows pressure in the tank housing space to be easily released through the ventilating opening. As a parameter for determining the total opening area, at least one of parameters: the number of gas fuel tanks, the capacity of the gas fuel tank, the internal pressure of the gas fuel tank, and the temperature of the tank housing space may be added to the capacity of the tank housing space. The total opening area may be the sum total of areas of the ventilating openings provided in the plurality of positions above the gas fuel tank in the upper surface of the roof cover and other ventilating openings (for example, the above-described slits).

The gas fuel tank-equipped vehicle of the present invention may include a lid member that is openably and closably mounted to the roof cover and is opened from a closed state when the tank housing space reaches predetermined pressure exceeding atmospheric pressure. The predetermined pressure is pressure freely determined within a range exceeding the atmospheric pressure, and may be determined, for example, to be lower than supposed maximum pressure in the tank housing space.

In the gas fuel tank-equipped vehicle, even if the tank housing space exceeds the atmospheric pressure and reaches the predetermined pressure due to some circumstances, the lid member is opened from the closed state to reduce pressure in the tank housing space. This can prevent the pressure in the tank housing space from becoming high, exceeding the predetermined pressure.

The lid member may be mounted with lower strength on a sidewalk side than a roadway side. The lid member may be mounted so that the sidewalk side is opened when the lid member is opened from the closed state. Further, the lid member may be mounted so that an end on the sidewalk side is raised with an end on the roadway side as a pivot. In these cases, the opened lid member does not fall toward a platform side. The lid member may be mounted to the vehicle or the roof cover via a control member that prevents the lid member from being removed from the vehicle when the lid member is opened from the closed state. This prevents the opened lid member from being removed from the vehicle. The control member may function so that the lid member opened from the closed state remains on the roof. This prevents the opened lid member from falling onto the ground. Also, the lid member may be elastically supported so as to be opened from the closed state according to internal pressure of the tank housing space or elastically supported so that an opening area changes after the lid member is opened according to the internal pressure of the tank housing space.

In the gas fuel tank-equipped vehicle of the present invention, a lower portion of the roof cover may be formed to cover an upper portion of a side surface of a vehicle body with a predetermined gap from the side surface. Thus, the lower portion of the roof cover is formed to cover the upper portion of the side surface of the vehicle body with the predetermined gap from the side surface, which improves an appearance when viewed from the front as compared with the case where a gap is provided between a lower edge of a front surface of a roof cover and a roof, and prevents running air from becoming turbulent because no gap is created in the front surface. The gas fuel tank-equipped vehicle may be a gas fuel tank-equipped vehicle including a gas fuel tank mounted on a roof of a vehicle body, and a roof cover that is provided to cover the roof and forms a tank housing space that can house one or more gas fuel tanks, wherein a lower portion of the roof cover is formed to cover an upper portion of a side surface of the vehicle body with a predetermined gap from the side surface.

In the gas fuel tank-equipped vehicle in which the lower portion of the roof cover is formed to cover the upper portion of the side surface of the vehicle body with the predetermined gap from the side surface, the upper portion of the side surface may be a boundary between the side surface and the roof. This reduces a distance between an entrance of the gap and the tank housing space, thereby allowing gas to easily flow into and out of the tank housing space through the gap.

In the gas fuel tank-equipped vehicle in which the lower portion of the roof cover is formed to cover the upper portion of the side surface of the vehicle body with the predetermined gap from the side surface, the lower portion of the roof cover may be secured in an abutting manner against a base protruding laterally from the side surface by a length substantially the same as the predetermined gap. This easily allows the gap between the lower portion of the roof cover and the side surface of the vehicle body to be constant in assembly of the roof cover. It may be allowed that a screw hole is provided in the base, and a bolt is inserted from the outside of the lower portion of the roof cover and screwed into the screw hole in the base.

In the gas fuel tank-equipped vehicle in which the lower portion of the roof cover is formed to cover the upper portion of the side surface of the vehicle body with the predetermined gap from the side surface, an on-off valve mounted to the gas fuel tank may be placed near the gap. Thus, even if gas fuel flows out of the on-off valve due to some circumstances, the gas fuel is easily diffused by air that flows in through the gap between the lower portion of the roof cover and the side surface of the vehicle body, or the gas fuel easily flows out through the gap.

In the gas fuel tank-equipped vehicle in which the lower portion of the roof cover is formed to cover the upper portion of the side surface of the vehicle body with the predetermined gap from the side surface, a vent may be formed in the upper portion of the roof cover. Thus, even if gas fuel leaks into the tank housing space due to some circumstances, the gas fuel is easily discharged outside by air that flows into the tank housing space through the gap between the lower portion of the roof cover and the side surface of the vehicle body and flows out through the vent in the upper portion. When the gas fuel is lighter than air, the gas fuel diffuses upward and easily flows outside through the vent in the upper portion.

In the gas fuel tank-equipped vehicle in which the lower portion of the roof cover is formed to cover the upper portion of the side surface of the vehicle body with the predetermined gap from the side surface, the roof cover includes a pair of cover side surface members formed along right and left side surfaces of the vehicle body, and a cover upper surface member formed in a position one step lower than the highest positions in a vehicle vertical direction of the pair of cover side surface members, and the vent may be formed between the highest position of the cover side surface member and the cover upper surface member. This improves an appearance because the vent is invisible from the outside of the vehicle. This configuration may be adopted alone or in combination with the configuration in which the gap is provided between the lower portion of the roof cover and the side surface of the vehicle body.

BEST MODE FOR CARRYING OUT THE INVENTION

Figure 1:
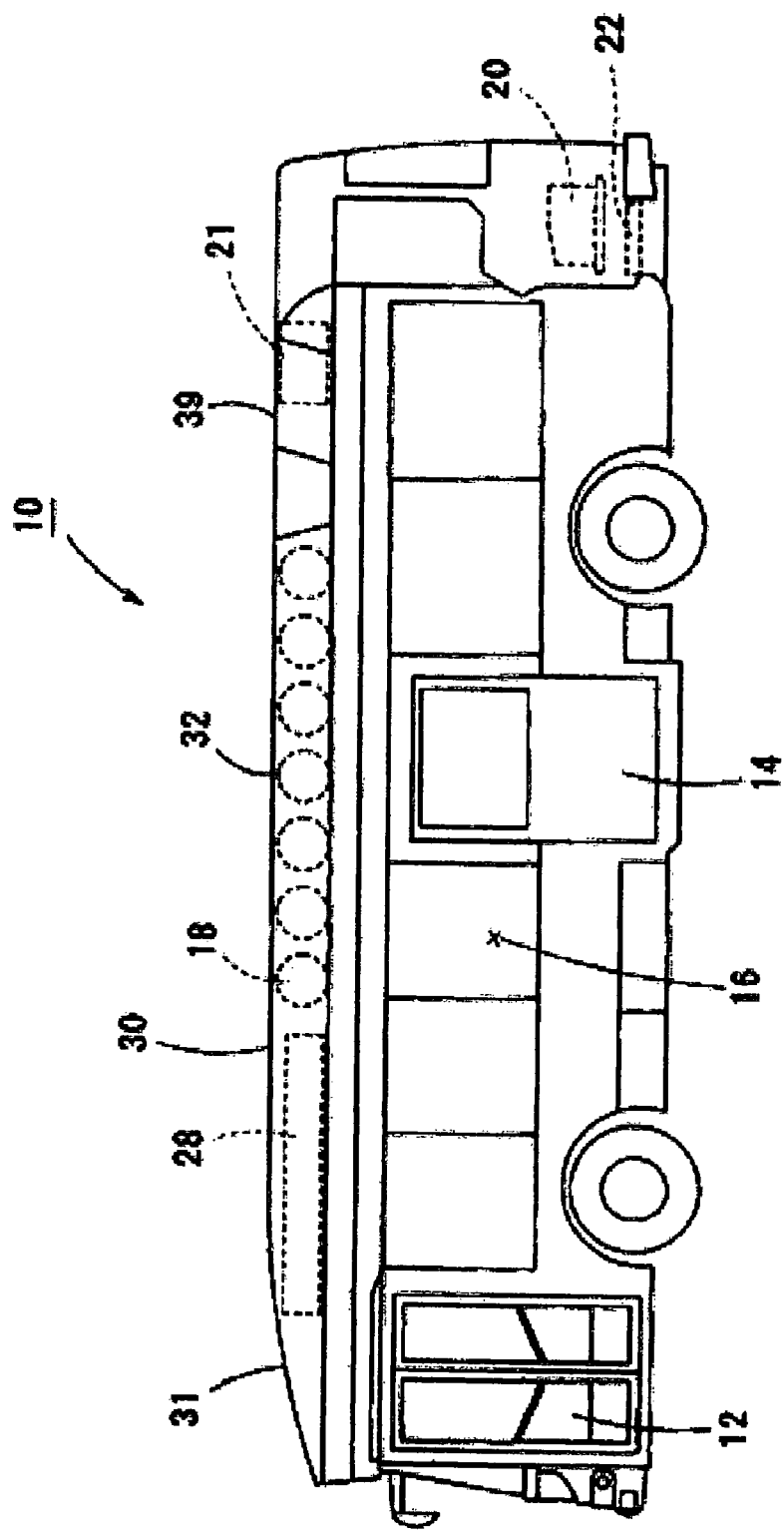
FIG. 1 is a left side view of a fuel cell-equipped bus 10 of the embodiment.
Figure 2:
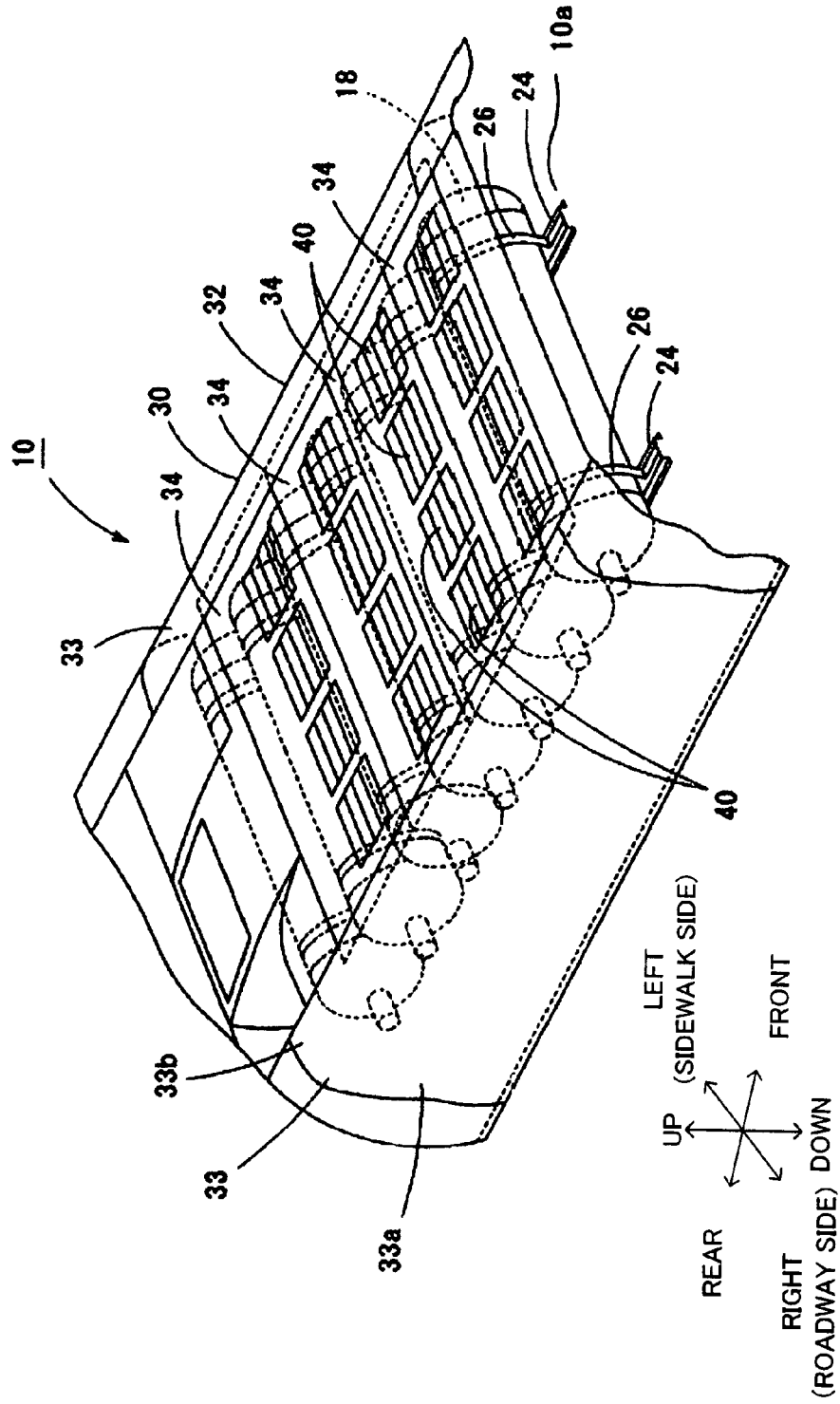
FIG. 2 is a perspective view of the middle and therearound of a roof cover 30 of the fuel cell-equipped bus 10.
Figure 3:
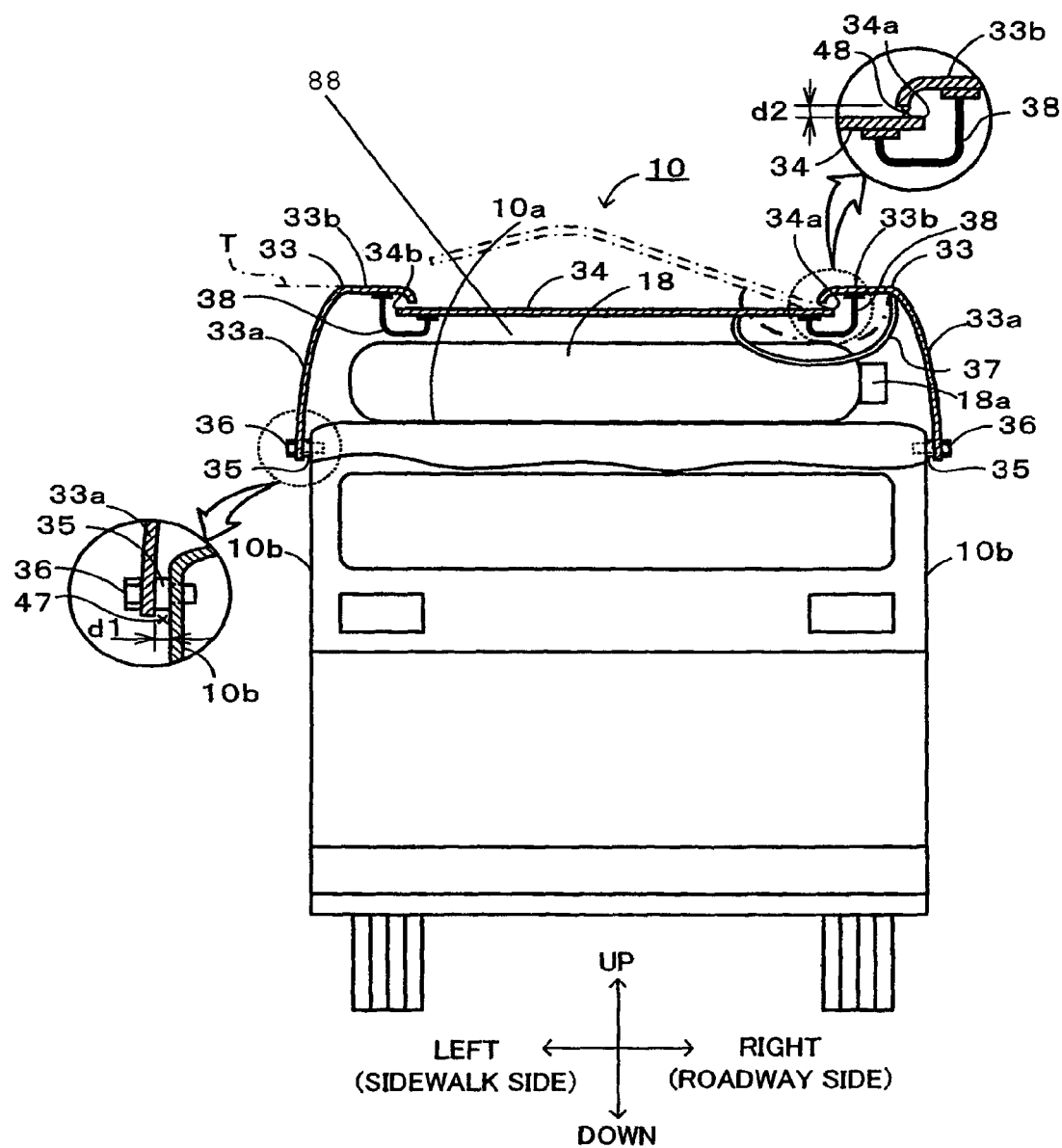
FIG. 3 is a back view (cross-sectional view) of the fuel cell-equipped bus 10.
Figure 4:
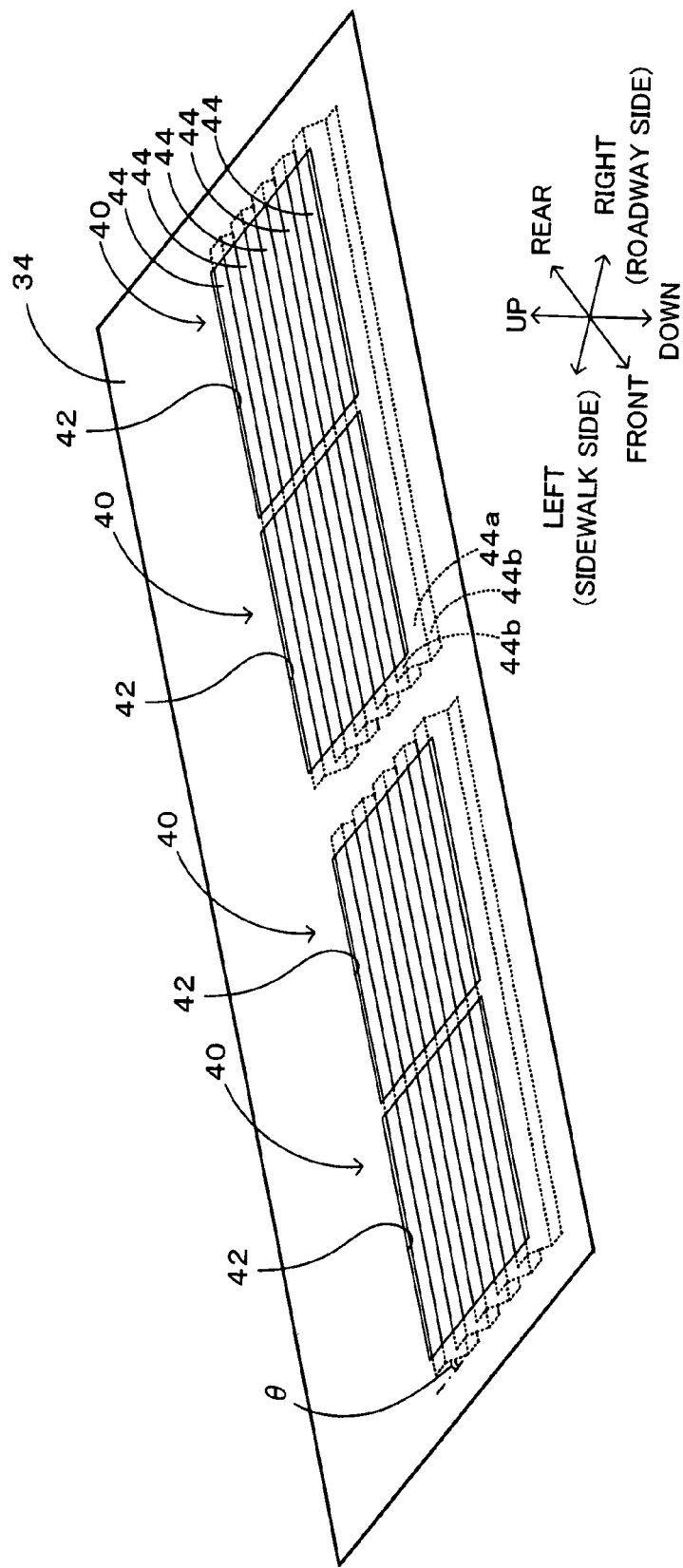
FIG. 4 is a perspective view of a cover middle upper surface member 34.

Now, the best mode for carrying out the present invention will be described with reference to the drawings. FIG. 1 is a left side view of a fuel cell-equipped bus 10, FIG. 2 is a perspective view of an upper portion of the fuel cell-equipped bus 10, FIG. 3 is a back view (cross-sectional view) of the fuel cell-equipped bus 10, and FIG. 4 is a perspective view of a cover middle upper surface member 34.

As shown in FIG. 1, the fuel cell-equipped bus 10 of the embodiment is configured as a large low-floor bus including a front platform 12 provided in the front in a left side surface and a middle platform 14 provided in the middle in the left side surface, through which passengers are loaded into and unloaded from a passenger compartment 16, and includes no platform in a right side surface of the vehicle. The fuel cell-equipped bus 10 includes seven hydrogen cylinders 18 as gas fuel tanks in an upper portion thereof, and a fuel cell stack 20 constituted by stacked several hundred fuel cells and various auxiliaries 22 associated with the fuel cells in a rear portion thereof. Hydrogen (fuel gas) is supplied from the hydrogen cylinder 18 to an anode of the fuel cell stack 20, air (oxidation gas) is supplied from an air compressor that is one of the auxiliaries 22 to a cathode of the fuel cell stack 20, and the fuel cell stack 20 generates power by electrical chemical reaction between hydrogen and oxygen contained in the air. In normal running of the fuel cell-equipped bus 10, an unshown motor rotationally drives wheels with the generated power.

Next, a configuration of the upper portion of the fuel cell-equipped bus 10 will be described in detail. As shown in FIG. 2, the fuel cell-equipped bus 10 includes, on a roof 10a in the upper portion, the seven hydrogen cylinders 18 fastened by metal belts 26, a roof cover 30 that forms a cylinder housing space that houses the hydrogen cylinders 18, and ventilating openings 40 provided in positions above the hydrogen cylinders 18 in an upper surface of the roof cover 30.

The hydrogen cylinders 18 are cylindrical containers containing high pressure hydrogen gas of several ten MPa (for example, 35 MPa), and placed to span a pair of rails 24 and 24 extending in a longitudinal direction on the right and left of the roof 10a and fastened by the metal belts 26 secured to each rail 24 and wound around the hydrogen cylinders 18. This prevents displacement of the hydrogen cylinders 18 during running. Each hydrogen cylinder 18 is connected to the anode of the fuel cell stack 20 by a gas pipe. At some midpoint of the gas pipe, an on-off valve or a pressure-reducing valve that is not shown is placed.

The roof cover 30 covers the entire roof of the fuel cell-equipped bus 10 to form an upper space, and the upper space includes a cylinder housing space 88 that houses the seven hydrogen cylinders 18 and a housing space for other devices. The cylinder housing space 88 is in fluid communication with gaps 47, 48 and ventilation openings 40 (to be described later). As shown in FIG. 1. the roof cover 30 includes a streamlined cover front portion 31 that covers a roof front portion in which an air conditioning unit 28 is placed, a cover middle portion 32 that covers a roof middle portion in which the plurality of hydrogen cylinders are placed, and a cover rear portion 39 that covers a roof rear portion in which a radiator 21 for dissipating heat of cooling water that cools the fuel cell stack 20 is placed.

As shown in FIGS. 2 and 3, the cover middle portion 32 of the roof cover 30 includes a pair of cover middle side surface members 33 and 33 provided in a standing manner on the right and left of the fuel cell-equipped bus 10, and four cover middle upper surface members 34, 34, 34 and 34 connected to upper ends of the pair of cover middle side surface members 33 and 33. (The cover middle upper surface members 34 may also be referred to as simply "upper surface members" or "lid members" throughout the specification and claims.) Each cover middle side surface member 33 includes a standing wall portion 33a formed substantially in flush with a side surface of the fuel cell-equipped bus 10, and a hood 33b bent from an upper end of the standing wall portion 33a toward the center of the vehicle and formed to be substantially parallel to the roof 10a. As shown in FIG. 3, the standing wall portion 33a abuts, near a lower end, a base 35 protruding laterally from a body side surface of the fuel cell-equipped bus 10, and in this state, a bolt 36 is inserted through the portion near the lower end and screwed into an unshown bolt hole formed in the base 35. As a result, the standing wall portion 33a of the cover middle side surface member 33 is spaced apart from the body side surface of the fuel cell-equipped bus 10 by a distance d1 corresponding to the height of the base 35 (several mm) to form a gap 47. The gap 47 extends in the longitudinal direction of the vehicle on each of the right and left of the vehicle. In order to obtain a good design or reduce air resistance, the distance d1 of the gap 47 is preferably smaller than a predetermined upper limit value so that the standing wall portion 33a is substantially flush with the body side surface lob, and a gap larger than a predetermined lower limit value is preferably formed so that airflow can be introduced into the cylinder housing space 88 when gas leaks from the hydrogen cylinder 18. Specifically, the distance d1 of the gap 47 is preferably set in view of a design, a reduction in air resistance, and introduction of air into the cylinder housing space 88, and preferably set so that these effects can be achieved to the greatest extent. For example, the distance d1 is preferably set within a range of 5 to 10 mm. The distance d1 is set also in view of the capacity of the cylinder housing space 88, the number of cylinders, and gas pressure of the cylinder.

As shown in FIG. 3, right and left ends of the cover middle upper surface member 34 are placed below the hoods 33b and 33b of the pair of cover middle side surface members 33 and 33 with gaps 48 of a distance d2 of several mm (for example, 5 to 10 mm) and connected by substantially J-shaped connectors 38. In other words, the cover middle upper surface member 34 is formed in a position one step lower than top positions of the pair of cover middle side surface members 33 and 33 (top positions in a vehicle vertical direction) T, and the gap 48 of the distance d2 is formed between the top position T of the cover middle side surface member 33 and the cover middle upper surface member 34. The gap 48 extends in the longitudinal direction on each of the right and left of the vehicle. The gaps 47 and 48 also constitute ventilating openings (vents) of the present invention. The cover middle upper surface member 34 is mounted so that when the cylinder housing space reaches predetermined pressure exceeding atmospheric pressure (herein set to be lower than supposed maximum pressure of the cylinder housing space (for example, withstand pressure)), an end 34b on a sidewalk side, that is, an end on a platform side is raised with an end 34a on a roadway side, that is, an end on the side opposite to the platforms 12 and 14 as a pivot, and opened from a closed state. Specifically, the cover middle upper surface member 34 is mounted so that connection strength between the end 34a on the roadway side of the cover middle upper surface member 34 and the hood 33b of the cover middle side surface member 33 is higher than connection strength between the end 34b on the sidewalk side of the cover middle upper surface member 34 and the hood 33b of the cover middle side surface member 33. Instead of the end 34b on the sidewalk side being raised with the end 34a on the roadway side as the pivot, it may be allowed that an easily deformable portion is provided in the cover middle upper surface member 34, and when the cylinder housing space reaches the predetermined pressure, this portion is deformed to open the end 34b on the sidewalk side. Also, a chain 37 spans a back surface of the end 34a on the roadway side of the cover middle upper surface member 34 and the cover middle side surface member 33, and the chain 37 serves to prevent the cover middle upper surface member 34 from being removed from the roof cover 30 of the fuel cell-equipped bus 10 or the vehicle body when the cover middle upper surface member 34 is opened. An on-off valve 18a of the hydrogen cylinder 18 is placed near the gaps 47 and 48 on the roadway side of the fuel cell-equipped bus 10.

As shown in FIG. 4, the ventilating opening 40 is constituted by a group of slits formed by a plurality of louvers 44 spanning an opening 42 provided in the cover middle upper surface member 34 at spaced intervals. Specifically, the plurality of louvers 44 having a length that can span two openings 42 and 42 on the right among four openings 42, 42, 42 and 42 provided in a vehicle width direction of the cover middle upper surface member 34 are provided at predetermined spaced intervals to form a group of slits, and the plurality of louvers 44 are similarly provided on two openings 42 and 42 on the left at predetermined spaced intervals to form a group of slits. The louver 44 is constituted by an inclined portion 44a inclined with respect to a horizontal surface and horizontal portions 44b and 44b connected to upper and lower ends of the inclined portion 44a, and has a substantially Z-shaped section. Horizontal portions 44b and 44b of two adjacent louvers 44 and 44 have a predetermined distance therebetween.

Figure 5:
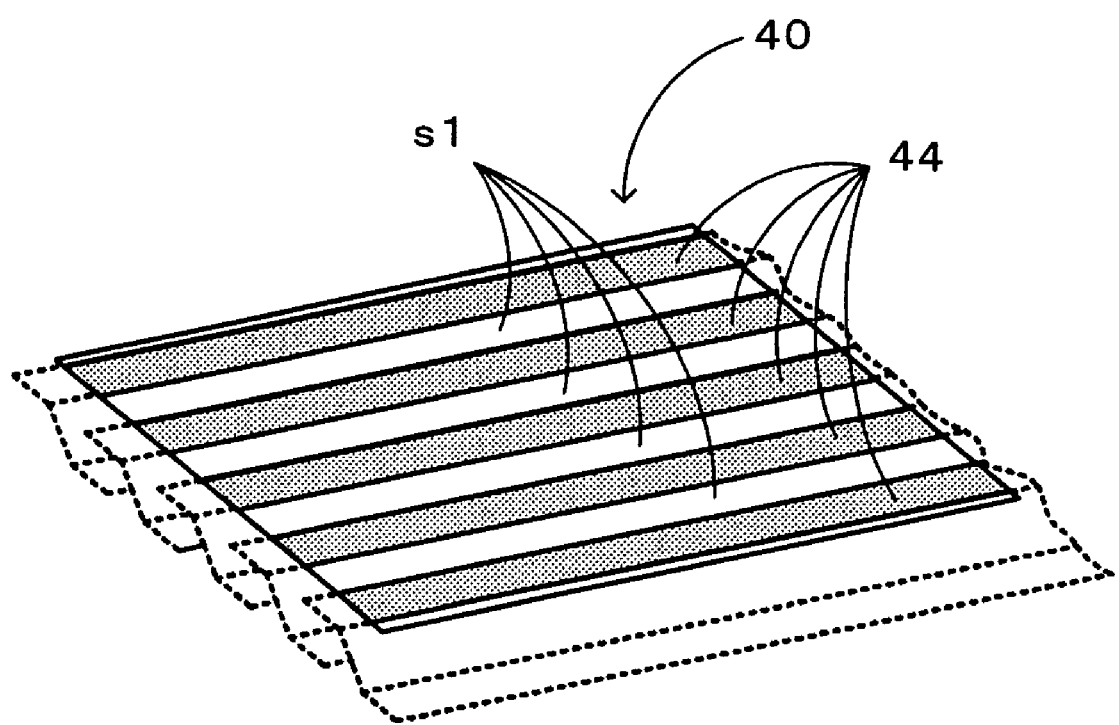
FIG. 5 illustrates an opening area of a ventilating opening 40.

In the embodiment, an inclination angle θ of the inclined portion 44a is determined within a range of 10 to 40° with respect the horizontal surface. An opening area of one ventilating opening 40 is the sum Σs1 of gap areas s1 between adjacent louvers 44 as shown in FIG. 5. In the embodiment, the total opening area S of the roof cover 30 is the sum total Σ (Σs1) of the sums Σs1 of the gap areas s1 of the ventilating openings 40 and an opening area s2 of the gap 47 and an opening area s3 of the gap 48. The total opening area S is determined based on the capacity C of the cylinder housing space, and specifically, the total opening area S increases with an increasing capacity C of the cylinder housing space so that pressure in the cylinder housing space is easily released through the ventilating openings 40 and the gaps 47 and 48.

Next, the function of the louver 44 in the fuel cell-equipped bus 10 of the embodiment will be described. The inclined portion 44a of the louver 44 prevents sunlight from being directly applied to the hydrogen cylinder, and the horizontal portion 44b of the louver 44 prevents a flying rock or the like from directly hitting the hydrogen cylinder 18. For example, the inclination angle θ of the inclined portion 44a is set so that sunlight during the day except dawn and dusk cannot pass through the ventilating opening 40, thereby effectively preventing the hydrogen cylinder 18 from being influenced by sunlight and deteriorating.

Figure 6:
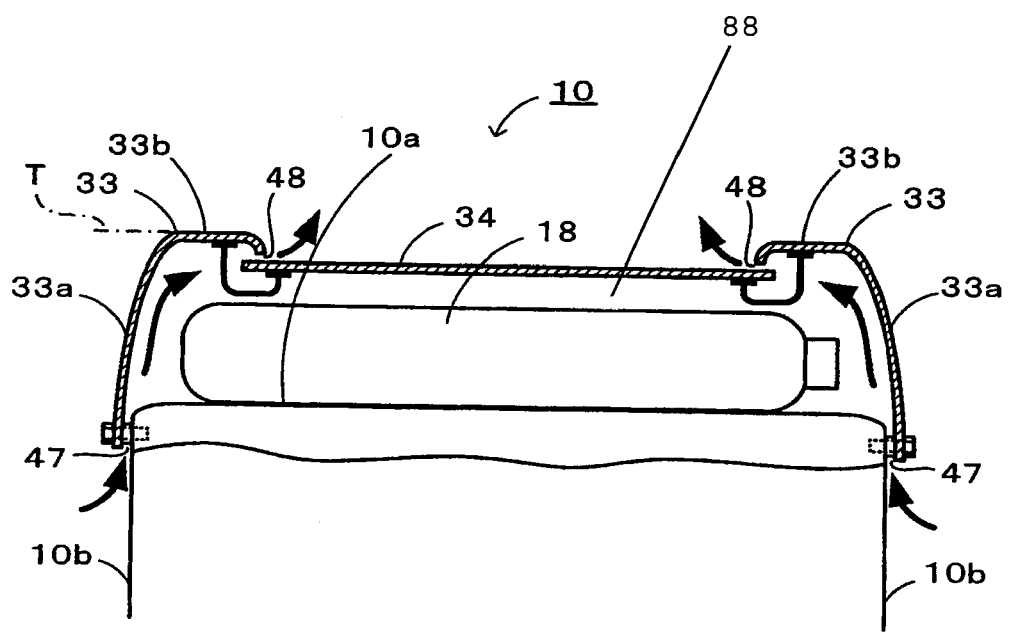
FIG. 6 illustrates leaking hydrogen and airflow.

Next, the case will be described where hydrogen leaks from the hydrogen cylinder 18 due to some circumstances in the fuel cell-equipped bus 10 of the embodiment. The hydrogen leaking from the hydrogen cylinder 18 has a lower specific gravity than air, thus rises in the cylinder housing space, and reaches the ventilating opening 40 constituted by the group of slits formed in the upper surface of the roof cover 30 or the gap 48. As shown in FIG. 6, air flows in through the gap 47 between the lower portion of the cover middle side surface member 33 and the side surface 10b of the body of the fuel cell-equipped bus 10, passes through the cylinder housing space, and reaches the ventilating opening 40 or the gap 48, and thus the leaking hydrogen flows outside along the airflow. At this time, the ventilating opening 40 and the gap 48 are formed in the position above the hydrogen cylinder 18, and thus the leaking hydrogen can reach the ventilating opening 40 or the gap 48 in a short distance as compared with the case where the ventilating opening is formed in a position apart from the position above the hydrogen cylinder. The ventilating openings 40 or the gaps 48 are provided in a plurality of locations, and thus the leaking hydrogen reaches the closest ventilating opening 40 or gap 48. The hydrogen gas reaches the ventilating opening 40 or the gap 48, passes therethrough and flows outside. The total opening area of the roof cover 30 is sufficiently large, thereby preventing the pressure in the cylinder housing space from becoming too high. Even if the pressure in the cylinder housing space reaches a predetermined pressure exceeding the atmospheric pressure, as shown by dash-single-dot lines in FIG. 3, the end 34b on the sidewalk side of the cover middle upper surface member 34 is raised with the end 34a on the roadway side as the pivot, and thus the opening area is sharply increased and the pressure in the cylinder housing space is sharply released. Also in this view, the pressure in the cylinder housing space does not become too high. The cover middle upper surface member 34 having being thus raised is configured to remain on the roof 10a by the chain 37.

According to the fuel cell-equipped bus 10 of the embodiment described above in detail, even if hydrogen gas leaks from the hydrogen cylinder 18 due to some circumstances, the hydrogen gas rises in the cylinder housing space, quickly reaches the closest ventilating opening 40 or gap 48 among the plurality of ventilating openings 40 or the gaps 48, and then efficiently flows outside. Thus, the hydrogen gas accumulated in the cylinder housing space can be discharged at an early stage. The total opening area of the roof cover 30 is set to be sufficiently large, and thus the pressure in the cylinder housing space can be easily released.

The ventilating opening 40 is constituted by the group of slits formed by the plurality of louvers 44 spanning the opening 42 at spaced intervals, and the louvers 44 serve to protect the hydrogen cylinder 18 from a flying rock or sunlight, or the like. Thus, durability of the hydrogen cylinder is increased as compared with the case where the ventilating opening 40 is a simple opening.

Further, the cover middle upper surface member 34 that is the component of the roof cover 30 is opened from the closed state when the cylinder housing space reaches the predetermined pressure exceeding the atmospheric pressure, and thus the opening area is sharply increased to rapidly reduce the pressure in the cylinder housing space. At this time, the cover middle upper surface member 34 does not fall toward the platform side because the end 34b on the sidewalk side is raised with the end 34a on the roadway side as the pivot. The opened cover middle upper surface member 34 is mounted so as to remain on the roof 10a via the chain 37, and is thus not removed from the fuel cell-equipped bus 10 to fall.

Further, the lower portion of the roof cover 30, that is, the lower portion of the standing wall portion 33a of the cover middle side surface member 33 is formed to cover the upper portion of the side surface 10b (a boundary between the roof 10a and the side surface 10b) with the gap 47 from the side surface 10b of the body of the fuel cell-equipped bus 10. This improves an appearance when viewed from the front as compared with the conventional case where the gap is provided between a lower edge of a front surface of a roof cover and a roof, and prevents running air from becoming turbulent because no gap is created in the front surface.

The gap 47 is provided in the boundary between the roof 10a and the side surface 10b. This reduces a distance between an entrance of the gap 47 and the cylinder housing space, thereby allowing gas to easily flow into and out of the cylinder housing space through the gap 47.

Also, the lower portion of the standing wall portion 33a of the cover middle side surface member 33 is secured in the abutting manner against the base 35 protruding laterally from the side surface 10b by a length substantially the same as the distance d1 of the gap 47. This easily allows the gap 47 between the lower portion of the standing wall portion 33a of the cover middle side surface member 33 and the side surface 10b of the vehicle body to be constant in assembly of the roof cover 30.

Further, the on-off valve 18a of the hydrogen cylinder 18 is placed near the gap 47 or the vent 48. Thus, even if hydrogen flows out of the on-off valve 18a due to some circumstances, the hydrogen is easily discharged outside. The leaking hydrogen is discharged outside by air that flows into the cylinder housing space through the gap 47 and flows out through the vent 48 or the ventilating opening 40 in the upper portion. Also, the hydrogen is lighter than air, and thus the hydrogen diffuses upward, and is discharged outside through the vent 48 or the ventilating opening 40 in the upper portion.

Further, the vent 48 is formed between the top position T of the cover middle side surface member 33 and the cover middle upper surface member 34 formed in the position one step lower than the top position T, and is invisible from the outside of the vehicle, thereby improving the appearance.

The present invention is not limited to the above-described embodiment, and may be carried out in various aspects within the technical scope of the present invention.

For example, in the above-described embodiment, the ventilating opening 40 is constituted by the group of slits formed by the plurality of louvers 44 spanning the opening at spaced intervals, but the ventilating opening may be constituted by an opening without a louver 44 (such as a rectangular hole or a circular hole), or by an opening covered with a grid member such as a mesh.

Figure 7:
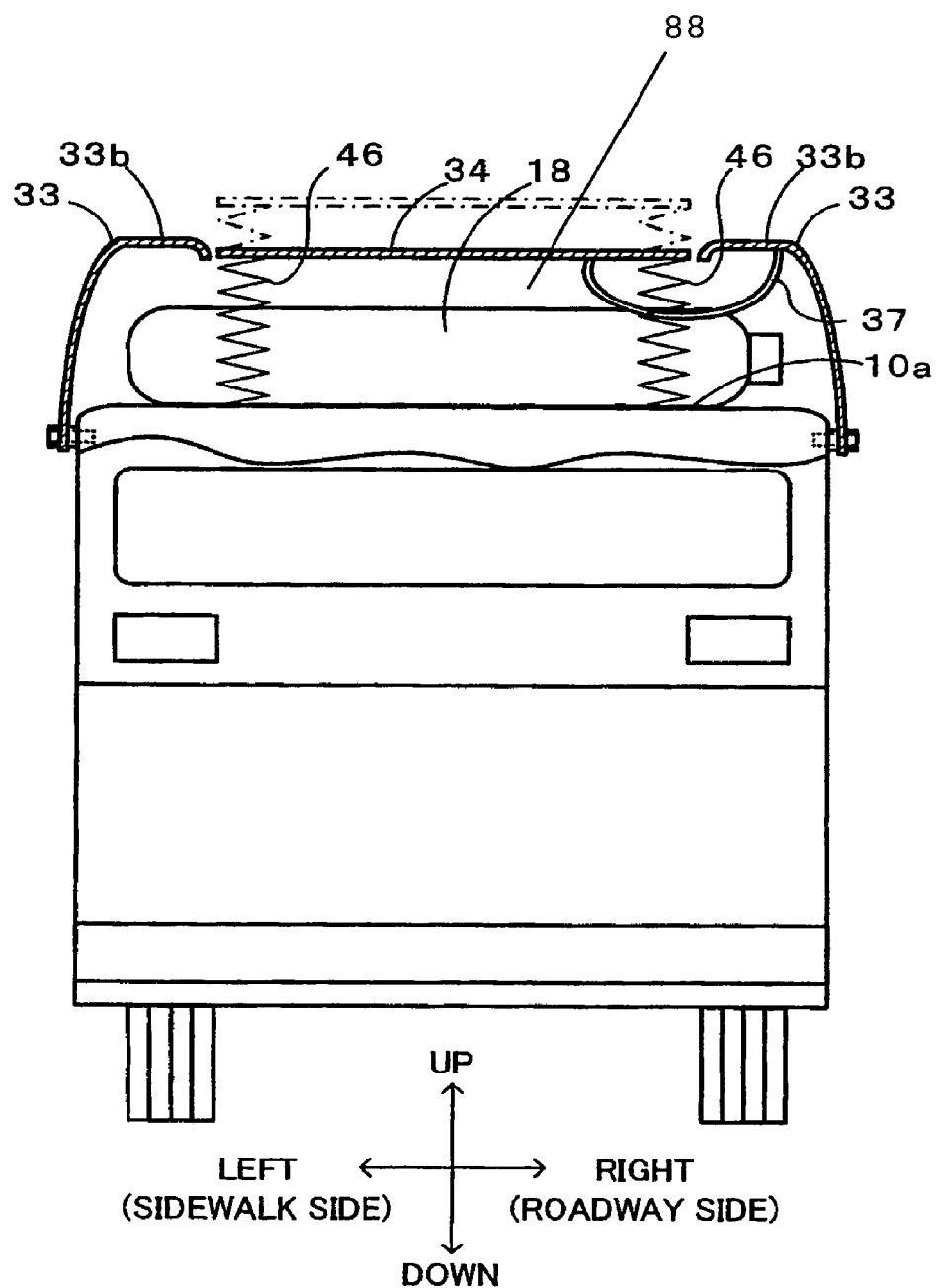
FIG. 7 is a back view (cross-sectional view) of a fuel cell-equipped bus of another embodiment.

In the above-described embodiment, the cover middle upper surface member 34 is connected to the back surface of the hood 33b of the cover middle side surface member 33. Alternatively, as shown in FIG. 7, the cover middle upper surface member 34 may be supported on the roof 10a via an elastic member 46 such as a spring so that the gap between the cover middle upper surface member 34 and the hood 33b of the cover middle side surface member 33, that is, the opening area is variable. Specifically, it may be allowed that the cover middle upper surface member 34 is elastically supported so that the gap between the cover middle upper surface member 34 and the hood 33b of the cover middle side surface member 33 becomes zero or small under normal conditions, and when the pressure in the cylinder housing space is increased, the cover middle upper surface member 34 is raised against an elastic force of the elastic member 46 by the application of the pressure to widen the gap between the cover middle upper surface member 34 and the hood 33b of the cover middle side surface member 33. Thus, even if the pressure in the cylinder housing space is increased, the opening area is increased to rapidly reduce the pressure.

In the above-described embodiment, the louver 44 is configured so that the direction from the lower end to the upper end of the inclined portion 44a is obliquely rearward with respect to the horizontal surface, but the direction from the lower end to the upper end of the inclined portion 44a may be obliquely forward with respect to the horizontal surface.

In the above-described embodiment, the capacity C of the cylinder housing space is used as the parameter for determining the total opening area S of the ventilating opening, but at least one of the number of hydrogen cylinders 18, the capacity of the hydrogen cylinder 18, the internal pressure of the hydrogen cylinder 18, and the temperature of the cylinder housing space may be added.

In the above-described embodiment, the cover middle upper surface member 34 and the cover middle side surface members 33 mounted to the right and left ends of the cover middle upper surface member 34 with gaps constitute the cover middle portion 32 of the roof cover 30, but the cover middle upper surface member 34 and the cover middle side surface members 33 may be connected without gaps, or the members 33 and 34 may be integrally formed.

In the above-described embodiment, the case where the law stipulates that vehicles run on the left side of a road is taken as an example, and the description is made with the left side of the vehicle being the sidewalk side, and the right side of the vehicle being the roadway side. However, the present invention is applicable to the case where the law stipulates that vehicles run on the right side of a road. In this case, the right and left configurations of the vehicle in the above-described embodiment are reversed, and the right side of the vehicle is the sidewalk side, and the left side of the vehicle is the roadway side.

In the above-described embodiment, the hydrogen cylinder 18 as a gas fuel tank is described as an example, but any tank may be used that is filled with gas fuel having a smaller specific gravity than air, and for example, a CNG cylinder may be used in a vehicle equipped with a CNG engine.

Figure 8:
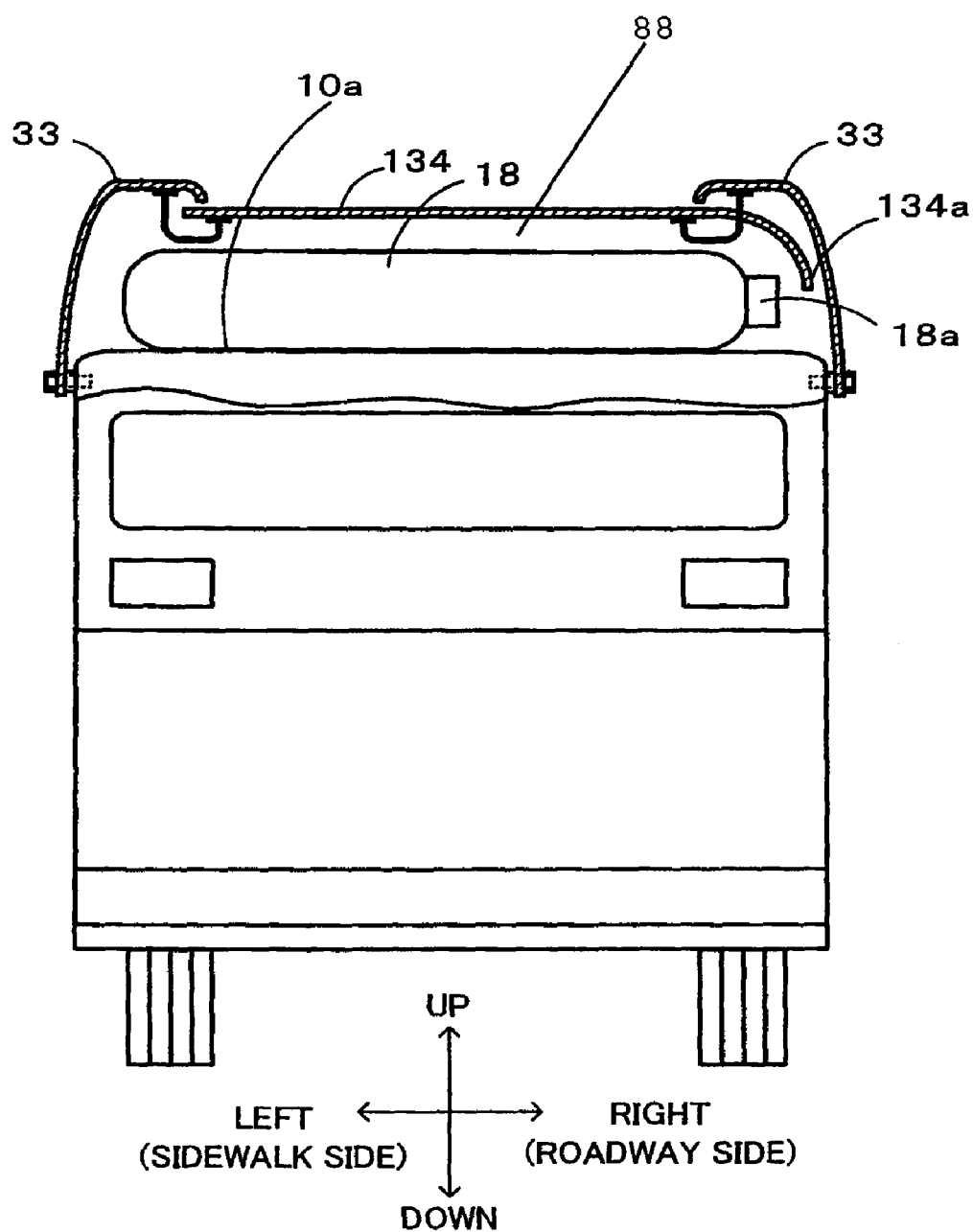
FIG. 8 is a back view (cross-sectional view) of a fuel cell-equipped bus of a further embodiment.

Instead of the cover middle upper surface member 34 of the above-described embodiment, a cover middle upper surface member 134 shown in FIG. 8 may be adopted. The cover middle upper surface member 134 has an end 134a on the roadway side that is hung so as to cover the on-off valve 18a of the hydrogen cylinder 18. Thus, even if rainwater enters the cylinder housing space through the ventilating opening 40 or the vent 48, the on-off valve 18a is not directly subjected to the rainwater. This can prevent corrosion of the on-off valve 18a caused by the rainwater.

In the above-described embodiment, the ventilating opening 40 and the gap 48 are provided in the upper portion of the roof cover 30, but the gap 48 only may be provided without the ventilating opening 40. In this case, the distance d2 of the gap 48 is preferably an opening area corresponding to the total opening area of the ventilating opening 40. Alternatively, the ventilating opening 40 only may be provided without the gap 48.

The disclose of Japanese Patent Applications No. 2005-002270 and No. 2005-002272 filed Jan. 7, 2005 including specifications, drawings and claims are incorporated herein by reference in their entirety.

INDUSTRIAL APPLICABILITY

The present invention is applicable in the industry producing vehicles to which a gas fuel tank is mounted, or the service industry using the vehicles.

The invention claimed is:

1. A gas fuel tank-equipped vehicle, comprising:
   a roof cover that is provided to cover a roof of the vehicle and forms a cylinder housing space that can house one or more gas fuel tanks, the roof cover having a pair of side surface members provided vertically on right and left sides of the vehicle, each of the pair of side surface members including:
   a standing wall portion formed substantially flush with a side surface of the vehicle; and
   a hood bent from an upper end of the standing wall portion toward the center of the vehicle and formed so as to be substantially parallel with the roof of the vehicle;
   an upper surface member connected to upper ends of the pair of side surface members such that right and left ends of the upper surface member are located below the hoods of the pair of side surface members such that gaps are formed between the hoods and the upper-most surface of the upper surface member,
   wherein the upper surface member includes a deformable portion,
   wherein the upper surface member is pivotably mounted to the roof cover, and
   wherein the upper surface member is opened from a closed state by deformation of the deformable portion when a pressure of the cylinder housing space reaches a predetermined pressure and returns to the closed state when the cylinder housing space pressure falls below the predetermined pressure, thereby releasing any gas leaked from the one or more gas fuel tanks to the exterior of the roof cover.

2. A gas fuel tank-equipped vehicle according to claim 1, wherein the upper surface member is mounted with lower strength on a sidewalk side of the upper surface member than on a roadway side of the upper surface member.

3. A gas fuel tank-equipped vehicle according to claim 1, wherein the upper surface member is mounted so that a sidewalk side of the upper surface member is opened when the upper surface member is opened from the closed state.

4. A gas fuel tank-equipped vehicle according to claim 1, wherein the upper surface member is mounted so that an end on the sidewalk side is raised with an end on the roadway side as a pivot when said upper surface member is opened from the closed state.

5. A gas fuel tank-equipped vehicle according to claim 1, wherein said upper surface member is mounted to the vehicle or the roof cover via a chain that prevents the upper surface member from being removed from the vehicle when the upper surface member is opened from the closed state.

6. A gas fuel tank-equipped vehicle according to claim 5, wherein the chain functions so that the upper surface member opened from the closed state remains on the vehicle roof.

7. A gas fuel tank-equipped vehicle according to claim 1, wherein said upper surface member is elastically supported so as to be opened from the closed state according to internal pressure of said cylinder housing space or elastically supported so that an opening area changes after the upper surface member is opened according to the internal pressure of said cylinder housing space.

8. A gas fuel tank-equipped vehicle according to claim 1, wherein a lower portion of said roof cover is formed to cover an upper portion of a side surface of a vehicle body with a predetermined gap from said side surface.

\* \* \* \* \*